United States Patent
Kang et al.

(10) Patent No.: US 10,397,604 B2
(45) Date of Patent: *Aug. 27, 2019

(54) METHOD AND APPARATUS FOR IMAGE ENCODING/DECODING

(71) Applicants: Electronics and Telecommunications Research Institute, Daejeon (KR); INDUSTRY-ACADEMIC COOPERATION GROUP OF SEJONG UNIVERSITY, Seoul (KR)

(72) Inventors: Jung Won Kang, Daejeon-si (KR); Ha Hyun Lee, Seoul (KR); Jin Ho Lee, Daejeon-si (KR); Jin Soo Choi, Daejeon-si (KR); Jin Woong Kim, Daejeon-si (KR); Jong Ki Han, Seoul (KR); Jae Yung Lee, Seoul (KR)

(73) Assignees: Electronics and Telecommunications Research Institute, Daejeon (KR); INDUSTRY-ACADEMIC COOPERATION GROUP OF SEJONG UNIVERSITY, Seoul (KR)

(*) Notice: Subject to any disclaimer, the term of this patent is extended or adjusted under 35 U.S.C. 154(b) by 0 days.

This patent is subject to a terminal disclaimer.

(21) Appl. No.: 15/805,861

(22) Filed: Nov. 7, 2017

(65) Prior Publication Data

US 2018/0115783 A1   Apr. 26, 2018

Related U.S. Application Data

(63) Continuation of application No. 14/141,565, filed on Dec. 27, 2013, now Pat. No. 9,848,202.

(30) Foreign Application Priority Data

Dec. 28, 2012 (KR) .................. 10-2012-0156372
Dec. 27, 2013 (KR) .................. 10-2013-0165758

(51) Int. Cl.
H04N 19/573 (2014.01)
H04N 19/30 (2014.01)

(52) U.S. Cl.
CPC ........... *H04N 19/573* (2014.11); *H04N 19/30* (2014.11)

(58) Field of Classification Search
None
See application file for complete search history.

(56) References Cited

U.S. PATENT DOCUMENTS

2009/0252220 A1   10/2009 Choi et al.
2013/0177084 A1*  7/2013 Wang ............... H04N 19/00684
                                              375/240.16
2013/0182755 A1   7/2013 Chen et al.

FOREIGN PATENT DOCUMENTS

KR   10-2007-0076504 A   7/2007
KR      10-1366288 B1    2/2014
WO    WO 2007/080223 A1   7/2007

OTHER PUBLICATIONS

Malvar et al., "Low-Complexity Transform and Quantization in H.264/AVC," IEEE Transactions on Circuits and Systems for Video Technology, vol. 13, No. 7, Jul. 2003, pp. 598-603. (Year: 2003).*

(Continued)

*Primary Examiner* — Christopher Braniff
(74) *Attorney, Agent, or Firm* — NSIP Law

(57) ABSTRACT

This document discloses a method and apparatus for image encoding/decoding which support multiple layers. The method for image decoding comprises analyzing a video parameter set (VPS) extension for layer dependency on a current layer, analyzing slices for layer dependency on a current slice by determining whether not to apply layer dependency to the current slice or to apply new layer dependency to the current slice, the new layer dependency determining within a range of layer dependency analyzed (Continued)

from the VPS extension, and constructing a reference picture list about the current layer based on at least one of layer dependency analyzed from the VPS extension and layer dependency analyzed from the slice.

6 Claims, 7 Drawing Sheets

(56) References Cited

OTHER PUBLICATIONS

Ye at al., "Improved H.264 Intra Coding Based on Bi-Directional Intra Prediction, Directional Transform, and Adaptive Coefficient Scanning," IEEE International Conference on Image Processing, 2008, pp. 2116-2119. (Year: 2008).*
J. Boyce, et al., "NAL unit header and parameter set designs for HEVC extensions", *Joint Collaborative Team on Video Coding (JCT-VC)* of ITU-T SG 16 WP 3 and ISO/IEC JTC 1/SC 29/WG 11, 11$^{th}$ Meeting, Shanghai, China, Oct. 10-19, 2012, pp. 1-8.
Boyce et al., "Information for Scalable Extension High Layer Syntax," Joint Collaborative Team on Video Coding (JCT-VC) of ITU-T SG16 WP3 and ISO/IEC JTC1/SC29/WG11, 8$^{th}$ Meeting: San Jose, CA, Feb. 2012.
Dong et al., "Description of Scalable Video Coding Technology Proposal by InterDigital Communications," Joint Collaborative Team on Video Coding (JCT-VC) of ITU-T SG16 WP3 and ISO/IEC JTC1/SC29/WG11, 11$^{th}$ Meeting: Shanghai, CN, Oct. 2012.
Korean Office Action dated Jan. 21, 2016, in counterpart Korean Application No. 10-2013-0165758 (8 pages, in Korean).

\* cited by examiner

FIG. 4

| RefPicSet LtCurr | RefPicSet LtFoll | RefPicSet StCurr Before | RefPicSet StCurr After | RefPicSet StFoll | RefPicSet IvCurr | ns and diversified user requirements, supported image quality, image size, and image frame need to be diversified accordingly.

As described above, due to heterogeneous communication networks and various types of terminals providing various functions, scalability, which refers to a feature supporting various levels of image quality, image resolution, image size, frame rate, and so on, is now becoming one of important specifications for video formats.

Therefore, to provide services requested by the users in various multimedia environments based on a highly efficient method for encoding videos, it is necessary to provide a scalability function which enables efficient video encoding and decoding with respect to time, space, and image quality.

METHOD AND APPARATUS FOR IMAGE ENCODING/DECODING

CROSS-REFERENCE TO RELATED APPLICATIONS

This application is a continuation of U.S. application Ser. No. 14/141,565 filed on Dec. 27, 2013, now U.S. Pat. No. 9,848,202 issued Dec. 19, 2017, which claims the benefit under 35 USC 119(a) of Korean Patent Application No. 10-2012-0156372 filed on Dec. 28, 2012 in the Korean Intellectual Property Office and Korean Patent Application No. 10-2013-0165758 filed on Dec. 27, 2013 in the Korean Intellectual Property Office, the entire disclosures of which are incorporated herein by reference for all purposes.

BACKGROUND OF THE INVENTION

Field of the Invention

The present invention is related to image encoding and decoding and more particularly, image encoding and decoding based on video coding.

Related Art

As multimedia environments are spreading widely, various types of terminals and networks are being introduced, and user requirements are being diversified accordingly.

In other words, as performance and computing capability differ among terminals, supported performance also varies depending on the type of terminal. For the case of networks through which information is transmitted, too, not only the physical structure such as a wired and wireless network but also the functions supported by networks are diversified according to the type of transmitted information, the amount of information, communication speed of information, and the like. A user selects a terminal and network to use depending on the function wanted by the user; also, terminals and a spectrum of networks provided by service providers to users are being diversified.

In this regard, HD (High Definition) resolution broadcasts are now being serviced not only for domestic regions but also for overseas regions, by which more and more people are being accustomed to high resolution, high quality images. For this reason, a plurality of image service-related organizations is working hard on developing next-generation image devices.

On the other hand, in addition to HDTVs, public attention to UHD (Ultra High Definition) TVs, which provide a resolution more than four times the resolution of HDTV, is increasing; thus, demand for a technology which can compress and process images of higher resolution and higher quality is getting higher.

To compress and process images, various technologies can be employed, including: inter-prediction technology estimating pixel values in a current picture by using the pictures located temporally before and/or after the current picture, intra-prediction technology estimating pixel values of a current picture by using pixel information of the current picture, and entropy coding technology assigning short code words to frequently appearing symbols but longer code words to those symbols appearing in low frequency.

As described above, by taking account of functions provided differently according to the types of terminals and

SUMMARY OF THE INVENTION

The present invention provides a method and apparatus for image encoding/decoding, capable of improving image encoding/decoding rate.

The present invention provides a method and apparatus for performing layer switching in scalable video coding capable of improving image encoding/decoding rate.

The present invention provides a method and apparatus for encoding/decoding scalable reference picture set information capable of improving encoding/decoding rate.

The present invention provides a method and apparatus for managing reference images in scalable video coding capable of improving image encoding/decoding rate.

According to one aspect of the present invention, a method for image decoding which supports multiple layers is provided. The method for image decoding comprises analyzing a video parameter set (VPS) extension for layer dependency on a current layer, analyzing slices for layer dependency on a current slice by determining whether not to apply layer dependency to the current slice or to apply new layer dependency to the current slice, the new layer dependency determining within a range of layer dependency analyzed from the VPS extension, and constructing a reference picture list about the current layer based on at least one of layer dependency analyzed from the VPS extension and layer dependency analyzed from the slice.

The layer dependency can be composed of at least one reference layer set including the number of reference layers which the current layer references and identifying information of the reference layer.

According to another aspect of the present invention, a method for image encoding which supports multiple layers is provided. The method for image encoding comprises determining layer dependency on a current layer from a video parameter set (VPS) extension, determining layer dependency on a current slice from a slice by determining whether not to apply layer dependency to the current slice or to apply new layer dependency to the current slice, the new layer dependency determining within a range of layer dependency analyzed from the VPS extension, and constructing a reference picture list about the current layer based on at least one of layer dependency analyzed from the VPS extension and layer dependency analyzed from the slice.

The layer dependency can be composed of at least one reference layer set including the number of reference layers which the current layer references and identifying information of the reference layer.

According to a yet another aspect of the present invention, an apparatus for image encoding which supports multiple layers is provided. The apparatus for image encoding comprises an encoding unit which determines layer dependency on a current layer from a video parameter set (VPS) extension, determines from slices layer dependency on a current slice by determining whether not to apply layer dependency to the current slice or to apply new layer dependency to the current slice, the new layer dependency determining within a range of layer dependency analyzed from the VPS extension, and performs encoding, and a prediction unit which constructs a reference picture list about the current layer based on at least one of layer dependency analyzed from the VPS extension and layer dependency analyzed from the slice and performs prediction of the current layer based on the reference picture list.

The layer dependency can be composed of at least one reference layer set including the number of reference layers which the current layer references and identifying information of the reference layer.

According to a still another aspect of the present invention, a method for image decoding which supports multiple layers is provided. The image decoding method comprises a decoding unit which analyzes layer dependency on a current layer from a video parameter set (VPS) extension, analyzes layer dependency on a current slice by determining whether not to apply layer dependency to the current slice or to apply new layer dependency to the current slice, and performs decoding, and a prediction unit which constructs a reference picture list about the current layer based on at least one of layer dependency analyzed from the VPS extension and layer dependency analyzed from the slice and performs prediction of the current layer based on the reference picture list.

The layer dependency can be composed of at least one reference layer set including the number of reference layers which the current layer references and identifying information of the reference layer.

According to a further aspect of the present invention, an apparatus for image decoding which supports multiple layers is provided. The image decoding apparatus comprises a decoding unit which analyzes layer dependency on a current layer from a video parameter set (VPS) extension, analyzes layer dependency on a current slice by determining whether not to apply layer dependency to the current slice or to apply new layer dependency to the current slice, and performs decoding, and a prediction unit which constructs a reference picture list about the current layer based on at least one of layer dependency analyzed from the VPS extension and layer dependency analyzed from the slice and performs prediction of the current layer based on the reference picture list.

In a layered encoding method capable of providing spatial, temporal, image quality, and viewpoint scalability, the present invention provides a method for managing reference images. When performing inter-layer prediction by using at least one or more reference layers, the present invention can efficiently manage reference images including decoded images of the reference layer. Also, according to the present invention, reference layers can be managed efficiently, and reference layers can be selected so that encoding efficiency can be maximized even in the same layer.

BRIEF DESCRIPTION OF THE DRAWINGS

FIG. 4 illustrates the structure of a reference picture list.

DESCRIPTION OF EXEMPLARY EMBODIMENTS

In what follows, embodiments of the present invention will be described in detail with reference to appended drawings. In describing embodiments of the present invention, if it is determined that detailed description of a related structure or function known for those in the art obscures the technical principles of the present invention, the corresponding description will be omitted.

If a component is said to be "linked" or "connected" to a different component, the component may be directly linked or connected to the different component, but a third component may exist to connect the two components. On the other hand, if a particular structure is said to be "included" in this document, it is not meant to exclude a structure other than the corresponding structure; rather, inclusion of the corresponding structure indicates that additional structures can be included in the embodiments or technical scope of the present invention.

Terms such as first and second can be used for describing various structures but the structures should not be limited by the terms. The terms are introduced only for the purpose of distinguishing one structure from the others. For example, a first structure may be called a second structure without departing from the scope of the present invention and vice versa.

Also, constituting units introduced in the embodiments of the present invention are described separately from each other to emphasize the distinctive functions thereof; it does not indicate that each constituting unit should be implemented by separate hardware or single software element. In other words, each constituting unit is described in its present form for the sake of convenience; at least two constituting units may comprise one constituting unit, or one constituting unit may be divided into multiple constituting units to perform a function. Both Integrated and separate embodiments of individual constituting units belong to the technical scope of the present invention as long as they do not depart from the technical principles of the present invention.

Also, part of constituting elements may not be mandatory elements carrying out essential functions of the present invention, but may be introduced as optional elements only to improve performance. The present invention can be realized by using only the mandatory elements needed to implement the technical principles of the present invention without employing the optional elements introduced only for performance enhancement, and a structure comprising only mandatory elements excluding optional ones used only for improving performance also belongs to the technical scope of the present invention.

Figure 1:
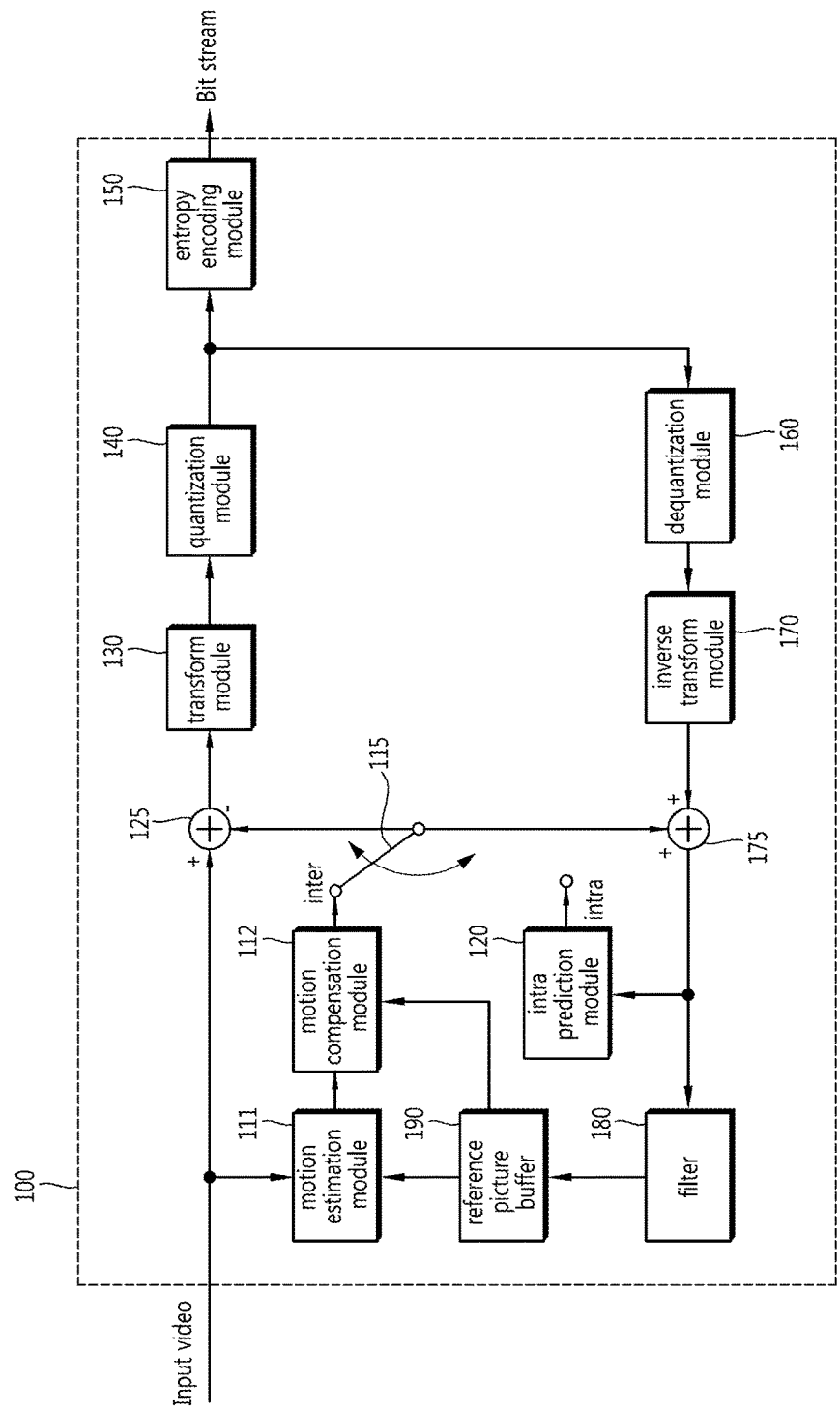
FIG. 1 is a block diagram illustrating the structure of an apparatus for image encoding according to one embodiment of the present invention.

FIG. 1 is a block diagram illustrating the structure of an apparatus for image encoding according to one embodiment of the present invention.

A method or apparatus for scalable video encoding/decoding can be implemented by extension of a conventional method or apparatus for image encoding/decoding not providing scalability, and the block diagram of FIG. 1 illustrates one embodiment of an apparatus for image encoding which can be a base of an apparatus for scalable video encoding.

With reference to FIG. 1, the apparatus for image encoding 100 comprises a motion estimation module 111, motion compensation module 112, intra-prediction module 120, switch 115, subtractor 125, transformation module 130, quantization module 140, entropy encoding module 150, dequantization module 160, inverse transformation module 170, adder 175, filter 180, and reference picture buffer 190.

The apparatus for image encoding 100 can perform encoding of input images in the intra or inter mode and produce bit streams. In the case of intra mode, the switch 115 is switched to intra mode, while in the case of inter mode, the switch 115 is switched to inter mode. Intra-prediction denotes in-picture prediction, while inter-prediction denotes inter-picture prediction. The apparatus for image encoding 100 generates prediction blocks for input blocks of an input image and encodes residuals between input blocks and prediction blocks. At this time, the input image may denote the original picture.

In the case of intra mode, the intra-prediction module 120 performs spatial prediction by using pixel values of already encoded/decoded blocks around a current block and generates prediction blocks.

In the case of inter mode, during a motion prediction process, the motion estimation module 111 searches reference images stored in the reference picture buffer 190 for a region that best matches the input block and obtains a motion vector. The motion compensation module 112 can generate prediction blocks by carrying out motion compensation by using the motion vector. Here, the motion vector is a two-dimensional vector employed for inter-prediction and represents an offset between a current target image to be encoded/decoded and a reference image.

The subtractor 125 can generate residual blocks from residuals between input blocks and generated prediction blocks.

The transformation module 130 transforms residual blocks and produces transform coefficients. At this time, transform coefficients denote the coefficients generated from transformation of residual blocks and/or residual signals. In what follows, transform coefficient level, which is obtained by quantizing transform coefficients, is also called transform coefficient.

The quantization module 140 quantizes input transform coefficients according to quantization parameters and produces quantized coefficients. The quantized coefficients can be called quantized transform coefficient level. At this time, the quantization module 140 can quantize input transform coefficients by using a quantization matrix.

The entropy encoding module 150 performs entropy encoding based on the values calculated from the quantization module 140 or encoding parameters calculated from an encoding process and produces bit streams. In case entropy encoding is applied, a small number of bits are allocated to a symbol with a high probability of occurrence while a large number of bits are allocated to a symbol with a low probability of occurrence; thus, the size of bit streams for target symbols to be encoded can be reduced. Therefore, compression performance of image encoding can be improved through entropy encoding. The entropy encoding module 150 can use an encoding method such as Exponential-Golomb, CAVLC (Context-Adaptive Variable Length Coding), and CABAC (Context-Adaptive Binary Arithmetic Coding) for entropy encoding.

Since the apparatus for image encoding 100 according to the embodiment of FIG. 1 performs inter-prediction encoding, namely inter-picture prediction encoding, currently encoded images are stored after decoding so that they can be used as reference images. Therefore, quantized coefficients are inversely quantized by the dequantization module 160 and inversely transformed by the inverse transformation module 170. The inversely quantized, inversely transformed coefficients are added to prediction blocks through the adder 175, and reconstructed blocks are generated.

The reconstructed block passes through the filter 180, and the filter 180 can apply at least one or more of deblocking filter, SAO (Sample Adaptive Offset), and ALF (Adaptive Loop Filter) to the reconstructed block or reconstructed picture. The filter 180 may be called an adaptive in-loop filter. The deblocking filter can remove distortions developed at the boundaries between blocks. The SAO can be used as an appropriate offset added to a pixel value to compensate a coding error. The ALF is able to carry out filtering based on the values from comparing a reconstructed image with its original image. Reconstructed blocks which have passed through the filter 180 can be stored in the reference picture buffer 190.

Figure 2:
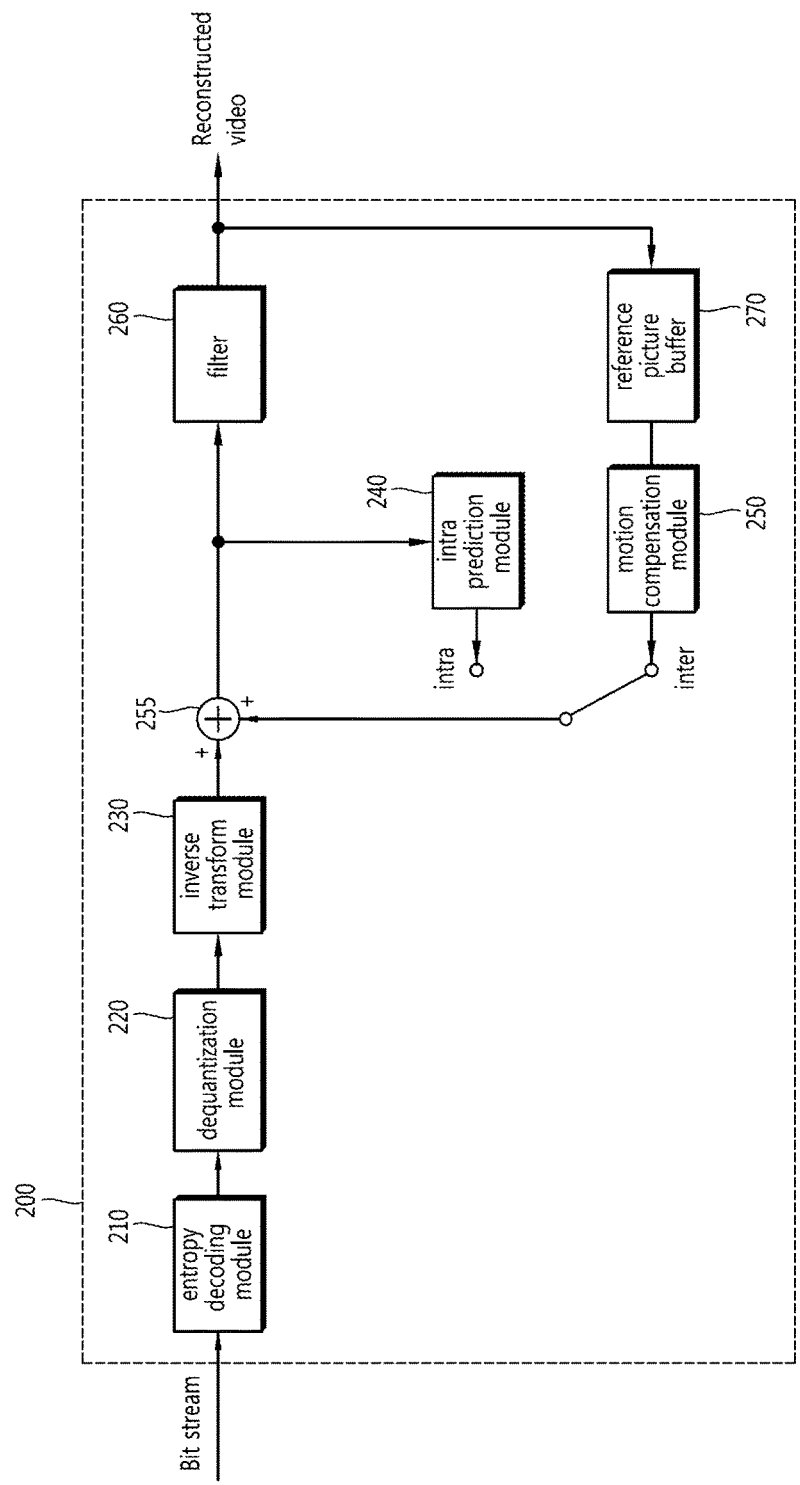
FIG. 2 is a block diagram illustrating the structure of an apparatus for image decoding according to one embodiment of the present invention.

FIG. 2 is a block diagram illustrating the structure of an apparatus for image decoding according to one embodiment of the present invention.

As described in detail with reference to FIG. 1, a method or apparatus for scalable video encoding/decoding can be implemented by extension of a conventional method or apparatus for image encoding/decoding not providing scalability, and the block diagram of FIG. 2 illustrates one embodiment of an apparatus for image decoding which can be a base of an apparatus for scalable video decoding.

With reference to FIG. 2, the apparatus for image decoding 200 comprises an entropy decoding module 210, dequantization module 220, inverse transformation module 230, intra-prediction module 240, motion compensation module 250, adder 255, filter 260, and reference picture buffer 270.

The apparatus for image decoding 200 receives a bit stream output from the encoder, performs decoding in the intra or inter mode, and produces a restructured image, namely reconstructed image. In the case of intra mode, the switch is switched to intra mode, while in the case of inter mode, the switch is switched to inter mode.

The apparatus for image decoding 200 obtains reconstructed residual blocks from the received bit streams, generates prediction blocks, and generates restructured blocks, namely reconstructed blocks by combining the reconstructed residual blocks and the prediction blocks.

The entropy decoding module 210 can perform entropy decoding of received bit streams according to the probability distribution thereof and generate symbols including symbols in the form of a quantized coefficient.

In case a method for entropy decoding is applied, a small number of bits are allocated to a symbol with a high probability of occurrence, while a large number of bits are allocated to a symbol with a low probability of occurrence; thus, the size of bit streams for the respective symbols can be reduced.

Quantized coefficients are inversely quantized by the dequantization module 220 and inversely transformed by the inverse transformation module 230, as the quantized coefficients are inversely quantized/transformed, reconstructed residual blocks can be generated. At this time, the dequantization module 220 can apply a quantization matrix to the quantized coefficients.

In the case of intra mode, the intra-prediction module 240 performs spatial prediction by using pixel values of already decoded blocks around a current block and generates prediction blocks. In the case of inter mode, the motion compensation module 250 can generate prediction blocks by performing motion compensation by using motion vectors and reference images stored in the reference picture buffer 270.

Residual blocks and prediction blocks are combined by the adder 255, and the added blocks may pass through the filter 260. The filter 260 can apply at least one or more of deblocking filter, SAO, and ALF to the reconstructed block or reconstructed picture. The filter 260 can produce a restructured image, namely reconstructed image. The reconstructed image, being stored in the reference picture buffer 270, can be used for inter-prediction.

Figure 3:
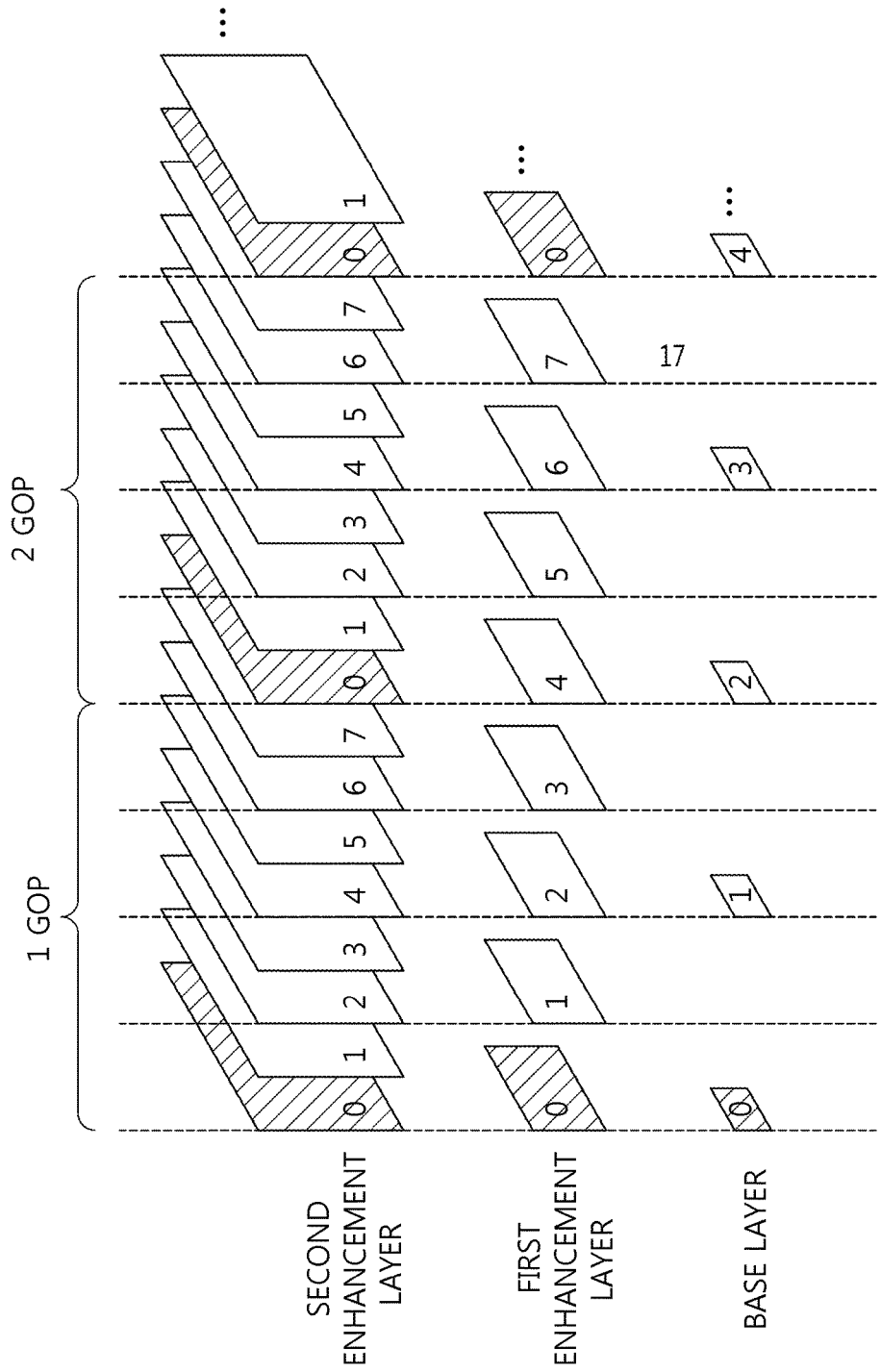
FIG. 3 is a conceptual drawing illustrating one example of a scalable video coding structure using multiple layers, to which the present invention can be applied.

FIG. 3 is a conceptual drawing illustrating one example of a scalable video coding structure using multiple layers, to which the present invention can be applied. GOP (Group of Pictures) of FIG. 3 represents a group of pictures.

A transmission medium is required to transmit image data, and performance of image data transmission shows a difference depending on a transmission medium and network environment. A method for scalable video coding can be employed to cope with various transmission medium or network environments.

A video coding method supporting scalability (hereinafter, it is called 'scalable coding' or 'scalable video coding') is intended to improve encoding and decoding performance by removing redundancy between layers by using information between layers such as texture information, motion information, and residual signals. The scalable video coding method can provide variable scalability from spatial, temporal, image quality, and viewpoint aspect depending on operating conditions such as transmission bit rate, transmission error rate, and system resources.

Scalable video coding can be carried out by making use of the structure of multiple layers to provide bit streams which can be applied to various network settings. For example, the structure of scalable video coding can include a base layer which compresses and processes image data by using the conventional image decoding method and an enhancement layer which compresses and processes image data by employing decoding information of the base layer and the conventional decoding method together.

At this time, the layer refers to a set of images and bit streams, which is distinguished from one another on the basis of spatial feature (for example, image size), temporal feature (for example, decoding order, image output order, and frame rate), image quality, complexity, and view point.

The base layer can be called a lower layer. The enhancement layer can be called a higher layer. At this time, the lower layer may refer to a layer supporting lower scalability than a particular layer, and the higher layer may refer to a layer supporting higher scalability than a particular layer. The layer referenced by a particular layer at the time of encoding or decoding can be called a reference layer.

With reference to FIG. 3, the base layer can be specified by SD (Standard Definition), frame rate of 15 Hz, and bit rate of 1 Mbps; first enhancement layer, HD (High Definition), frame rate of 30 Hz, and bit rate of 3.9 Mbps; and second enhancement layer, 4K-UHD (Ultra High Definition), frame rate of 60 Hz, and bit rate of 27.2 Mbps.

The above specifications of the format, frame rate and bit rate are one embodiment; they can be determined differently depending on the needs. Also, the number of layers employed is not limited to the present embodiment and can be varied according to an operating scenario. For example, if transmission bandwidth is 4 Mbps, frame rate of the first HD enhancement layer can be reduced, and image data can be transmitted with a frame rate of 15 Hz or below.

The scalable video coding method can provide temporal, spatial, image quality, and view point scalability by using the method described in detail in the embodiment of FIG. 3.

In this document, scalable video coding represents scalable video encoding in view of encoding, while it represents scalable video decoding in view of decoding.

Meanwhile, layers in the structure of scalable video coding exhibit strong correlation among them; thus, if prediction is performed on the basis of the correlation, data redundancy can be removed, and performance of image encoding can be improved. Therefore, in the case of predicting an image of a current (higher) layer being encoding or decoded, not only inter-prediction or intra-prediction using information of the current layer but also inter-layer prediction using information of other layers can be performed.

Since the inter-layer prediction makes use of information of other layers, the information of other layers is necessary for inter-layer prediction. In other words, information of other layer (reference layer) used for inter-layer prediction of a current layer, information of a reference picture referenced within the reference layer, and so on are required. In case inter-layer prediction as described above is used, management of a reference layer referenced by the current layer and reference pictures is needed.

As information related to management of reference pictures meant for inter-layer prediction (hereinafter, inter-layer reference picture management) is transmitted by an encoder, information notifying of how many layers each layer references and information notifying of which layers each layer references can be transmitted by using the inter-layer dependency set by the encoder. Information for managing reference pictures can be transmitted in various forms, one example of which is a video parameter set (VPS) extension. For example, the VPS extension can include information notifying of how many layers each layer references and information notifying of which layers each layer references.

For example, a decoder can analyze from the VPS extension num_direct_ref_layers[layerID] representing the number of reference layers referenced by each layer and ref_layer_id[i] representing reference layers referenced by each layer. At this time, i of ref_layer_id[i] ranges from '0' to the value specified by num_direct_ref_layers which informs how many layers each layer references. In other words, how many layers a current layer references and a reference layer of the currently layer can be known from the VPS extension.

Once analysis of layers to be referenced by each layer is completed, a reference picture list can be constructed. At this time, the reference picture list can include reference pictures to be used for inter-layer prediction as well as the reference pictures meant for inter-prediction.

FIG. 4 illustrates the structure of a reference picture list.

With reference to FIG. 4, a reference picture list can comprise a long-term reference picture set referenced by a current picture (RefPicSetLtCurr), long-term reference picture set not referenced by the current picture (RefPicSetLt- Foll), forward direction short-term reference picture set referenced by the current picture (RefPicSetStCurrBefore), inverse direction short-term reference picture set referenced by the current picture (RefPicSetStCurrAfter), short-term reference picture set not referenced by the current picture (RefPicSetStFoll), and reference picture set referenced by the current picture for inter-layer prediction (RefPicSetIvCurr).

The reference picture set (RefPicSetIvCurr) referenced for inter-layer prediction can include as many reference layers as the number of num_direct_ref_layers signaled from the VPS extension.

The reference picture set (RefPicSetIvCurr) referenced for inter-layer prediction can include a picture having the same layer identifier (layer_id) as the ref_layer_id[i] signaled from the VPS extension and having the same POC (Picture Order Count) as a current picture of a current layer. The POC can correspond to a value with which pictures belonging to the same layer can be identified or a value representing an output order.

Those pictures comprising the reference picture set referenced for inter-layer prediction (RefPicSetIvCurr) are all marked as "used for long-term reference".

In what follows, described will be a method for managing reference pictures in an efficient manner in the case of performing inter-layer prediction including at least one or more reference layers in a scalable video coding structure.

Figure 5:
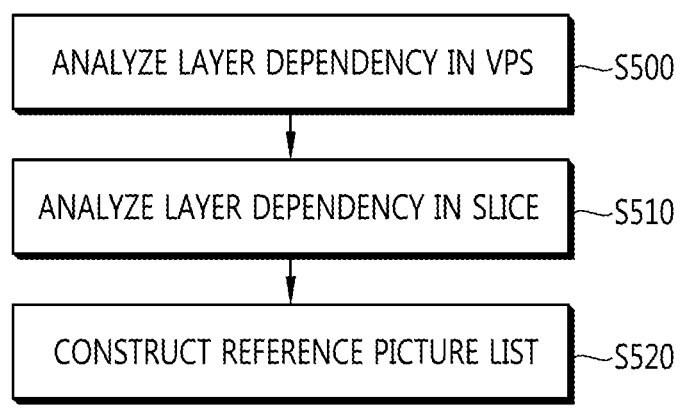
FIG. 5 is a flow diagram illustrating a method for managing reference pictures in scalable video coding according to an embodiment of the present invention.

FIG. 5 is a flow diagram illustrating a method for managing reference pictures in scalable video coding according to an embodiment of the present invention. The method illustrated in FIG. 5 can be carried out by the apparatus for image encoding described in FIG. 1 or by the apparatus for image decoding described in FIG. 2.

With reference to FIG. 5, the encoder or decoder analyzes layer dependency in a VPS extension S500.

Analyzing layer dependency, as described earlier, indicates examining dependency between layers to encode or decode a current layer and indicates examining a reference relationship between layers to use images of other layers as a reference image at the time of encoding or decoding the current layer.

From the viewpoint of the encoder, at the time of encoding layer dependency by using the VPS extension, the encoder can use (1) an existing method for representing layer dependency or (2) either of the existing method for representing layer dependency and a method for representing layer dependency by using a scalable reference layer set (hereinafter, SRLS) for layers to be referenced by each layer.

At this time, the method for representing layer dependency by using an SRLS refers to a method which specifies beforehand the number of reference layers (num_direct_ref_layers) that can be referenced by a current layer and reference layer identifiers (ref_layer_id) in the SRLS and allows the SRLS to be employed.

In the case of performing encoding by using the existing method for representing layer dependency, the encoder can encode layer dependency according to the existing methods as described with reference to FIG. 4.

In the case of performing encoding by using the existing method for representing layer dependency and a method for representing layer dependency by using the SRLS, the encoder first of all encodes a flag informing of which method has been used (for example, vps_srls_present_flag) and encodes layer dependency according to the flag.

For example, in case the existing method for representing layer dependency is used, vps_srls_present_flag is encoded as 0, and layer dependency can be encoded through the existing syntax. In case the method for representing layer dependency using an SRLS is employed, vps_srls_present_flag is encoded as 1, and the syntax informing of how many layer dependency sets (SRLS) to use (for example, num_scalable_ref_layer_sets) and information about each layer dependency set (scalable_ref_layer_set( )) can be encoded.

From the viewpoint of the decoder, in case the encoder performs encoding by using the existing method for representing layer dependency, the decoder can decode layer dependency according to the existing method without change of syntax.

In case the encoder performs encoding by using either of the existing method for representing layer dependency and a method for representing layer dependency by using an SRLS, the decoder first of all decodes a flag (for example, vps_srls_present_flag) informing of which method has been used to decode layer dependency and decodes layer dependency information according to the flag.

Table 1 illustrates one example of syntax representing a method for analyzing layer dependency in a VPS extension.

TABLE 1

| | Descriptor |
|---|---|
| vps_extension( ) { | |
|   while( !byte_aligned( ) ) | |
|     vps_extension_byte_alignment_reserved_one_bit | u(1) |
|   avc_base_codec_flag | u(1) |
|   scalability_mask | u(16) |
|   for( i = 0; i <NumScalabilityTypes; i++ ) { | |
|     dimension_id_len_minus1[i] | u(3) |
|   } | |
|   vps_nuh_layer_id_present_flag | u(1) |
|   // layer specific information | |
|   for( i = 1; i <= vps_max_layers_minus1; i++) { | |
|     // mapping of layer ID to scalability dimension IDs | |
|     if( vps_nuh_layer_id_present_flag ) | |
|       layer_id_in_nuh[ i ] | u(6) |
|     for( j = 0; j <= num_dimensions_minus1; j++ ) | |
|       dimension_id[ i ][ j ] | u(v) |
|   } | |
|   for( i = 1; i <= vps_max_layers_minus1 ; i++) { | |
|     profile_tier_level( 1, vps_max_sub_layers_minus1 ) | |
|   vps_srls_present_flag | u(1) |
|   if( vps_srls_present_flag ) { | |
|     num_scalable_ref_layer_sets | ue(v) |
|     for( i = 0; i < num_scalable_ref_layer_sets ; i++ ) | |
|       scalable_ref_layer_set(i) | |
|   } | |
|   else { | |
|     for( i = 1; i <= vps_max_layers_minus1; i++ ) { | |
|       // layer dependency | |
|       num_direct_ref_layers[ i ] | u(6) |
|       for( j = 0; j < num_direct_ref_layers[ i ]; j++ ) | |
|         ref_layer_id[ i ][ j ] | u(6) |
|       } | |
|     } | |
| } | |

With reference to Table 1, vps_srls_present_flag is a flag meant for informing of which method is used to encode layer dependency between the existing method for representing layer dependency and a method for representing layer dependency using an SRLS. For example, in case vps_srls_present_flag is 0, it indicates that the existing method for representing layer dependency has been used for encoding; on the other hand, in case vps_srls_present_flag is 1, it indicates that a method for representing layer dependency using an SRLS has been used for encoding.

num_scalable_ref_layer_sets represents the number of layer dependency sets (SRLSs).

scalable_ref_layer_set( ) represents the structure of each layer dependency set.

The decoder can perform decoding of vps_srls_present_flag to analyze layer dependency in a VPS.

In case vps_srls_present_flag is 0, the decoder can decode syntax by using the existing method for representing layer dependency.

In case vps_srls_present_flag is 1, the decoder can decode syntax by using a method for representing layer dependency using an SRLS. At this time, the decoder can determine the number of layer dependency sets (SRLSs) by decoding num_scalable_ref_layer_sets and construct each layer dependency set (SRLS) by decoding scalable_ref_layer_set( ).

Figure 6:
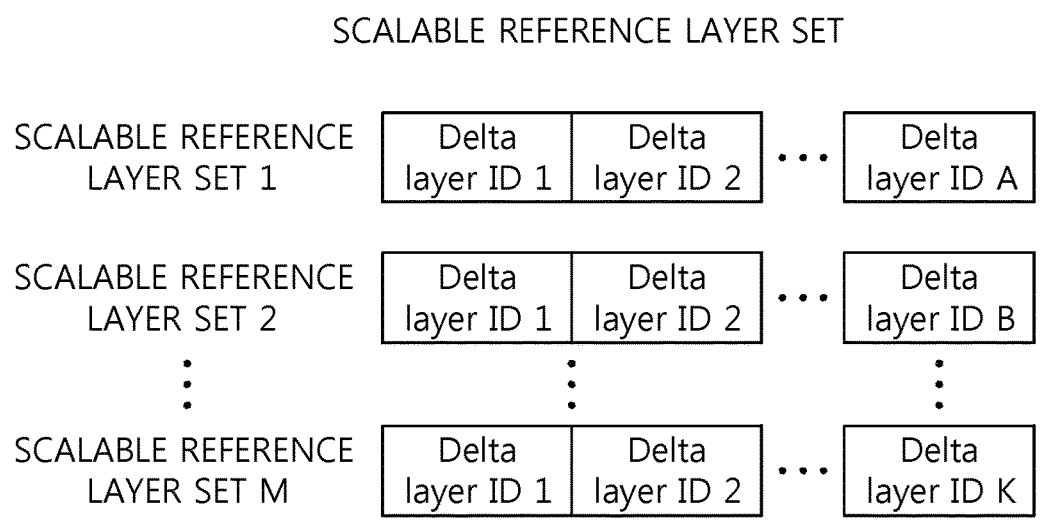
FIG. 6 illustrates a method for constructing a scalable reference layer set (SRLS) or a layer dependency set according to the present invention.

A method for constructing a layer dependency set (SRLS) according to the present invention will be descried in detail with reference to FIG. 6.

An encoder or decoder analyzes layer dependency in a slice S510.

In case layer dependency is analyzed on the basis of a slice, the encoder or decoder can use either of (1) a method for using/changing layer dependency in a current slice, where the layer dependency in a VPS extension is analyzed according to the existing method and (2) a method for using/changing layer dependency in a current slice, where the layer dependency in a VPS extension is represented in the form of an SRLS.

In case layer dependency is used/changed in a current slice, where the layer dependency in the VPS extension is analyzed according to the existing method, the encoder can determine whether not to use layer dependency for the current slice or whether to apply new layer dependency to the current slice; and can perform encoding of such information for each slice by using a flag (for example, slice_srls_present_flag).

In case a method for applying new layer dependency to a current slice is used, the encoder can encode the number of layers that can be referenced by the current slice into syntax information (for example, num_scalable_ref_layer) and transmits the syntax information; and encode as many reference layers as the number of layers that can be referenced into syntax information (for example, scalable_ref_layer[i]) and transmits the syntax information. The new layer dependency can be applied within the range of inter-layer dependency established in the VPS extension.

In case layer dependency in the VPS extension, which is analyzed according to the existing method, is used/changed in a current slice, the decoder first of all can decode a flag indicating whether not to apply layer dependency to the current slice or whether to apply new layer dependency to the current slice (for example, slice_srls_present_flag) and decode layer dependency information about the current slice according to the flag.

Table 2 is one example of syntax illustrating a method for using/changing layer dependency in a current slice, where the layer dependency is analyzed in a VPS extension according to the existing method.

TABLE 2

|  | Descriptor |
|---|---|
| slice_segment_header ( ) { | |
| ... | |
| if ( nuh_layer_id > 0 ) { | |

TABLE 2-continued

|  | Descriptor |
|---|---|
| slice_srls_present_flag | u(1) |
| if (slice_srls_present_flag ) { | |
| num_scalable_ref_layer | u(v) |
| for ( i = 0; i < NumActiveRefLayerPics; i ++ ) | |
| Scalable_ref_layer [ i ] | u(v) |
| } | |
| } | |
| ... | |
| byte_alignment ( ) | |
| } | |

With reference to Table 2, slice_srls_present_flag is a flag indicating whether not to apply layer dependency to a current slice or whether to apply new layer dependency to the current slice.

num_scalable_ref_layer represents the number of layers referenced by a current slice.

scalable_ref_layer[i] represents layer_id of a layer to be referenced or information meant for identifying layers to be referenced.

TABLE 3

| | |
|---|---|
| if ( nuh_layer_id > 0 && !all_ref_layers_active_flag && NumDirectRefLayers[ nuh_layer_id ] > 0 ) { | |
| slice_srls_present_flag | u(1) |
| if ( slice_srls_present_flag && NumDirectRefLayers[ nuh_layer_id ] > 1 ) { | |
| num_scalable_ref_layer | u(v) |
| if (NumActiveRefLayerPics != NumDirectRefLayers[ nuh_layer_id ] ) | |
| for ( i = 0; i < NumActiveRefLayerPics; i ++) | |
| scalable_ref_layer [ i ] | u(v) |
| } | |
| } | |

Table 3 is an embodiment of the syntax of Table 2. With reference to Table 3, slice_srls_present_flag is a flag indicating whether not to apply layer dependency to a current slice or whether to apply new layer dependency to the current slice. For example, if slice_srls_present_flag is 1, it indicates that new layer dependency is applied to the current slice, whereas, if slice_srls_present_flag is 0, it indicates that layer dependency is not applied to the current slice. If slice_srls_present_flag is 0, num_scalable_ref_layer is set to 0, and the current slice does not use an inter-layer reference.

slice_srls_present_flag can be analyzed when the following conditions are all met: a layer to be encoded currently is not the base layer; inter-layer dependency established in the VPS extension is not used at all; and with inter-layer dependency established in the VPS extension, the number of layers that can be referenced by the current layer is one or more.

num_scalable_ref_layer represents the number of layers to be referenced by a current slice. num_scalable_ref_layer can be analyzed when slice_srls_present_flag is 1, and the number of layers that can be referenced from inter-layer dependency established in the VPS extension is two or more. num_scalable_ref_layer can have a value larger than 1 and smaller than the number of layers that can be referenced by a current layer from inter-layer dependency established in the VPS extension. In case the number of layers that can be referenced by the current layer from inter-layer dependency established in the VPS extension is 1, num_scalable_ref_layer is set to 1 without analyzing thereof.

scalable_ref_layer[i] represents layer_id of a layer to be referenced or information with which a layer to be referenced can be identified. If the number of layers that can be referenced by a current layer from inter-layer dependency in the VPS extension is the same as num_scalable_ref_layer, scalable_ref_layer[i] is set as information with which a reference layer, specified by inter-layer dependency established in the VPS extension, can be identified in the same way without analyzing scalable_ref_layer[i].

The decoder can decode slice_srls_present_flag to analyze layer dependency in a slice. If slice_srls_present_flag is 1, new layer dependency is established in a current slice whereas, if slice_srls_present_flag is 0, layer dependency is not defined.

In case new layer dependency is established for a current slice, the decoder can find out the number of layers that can be referenced by the current slice by decoding num_scalable_ref_layer, and obtain layer_id of a layer to be referenced or information with which a layer to be referenced can be identified by decoding scalable_ref_layer[i] as many times as the number of layers to be referenced by the current slice.

Meanwhile, in case layer dependency is used/changed in a current slice, where the layer dependency in a VPS extension is represented in the form of an SRLS, the encoder determines whether to use layer dependency established in the VPS extension or whether to introduce new layer dependency to the current slice, and performs encoding of determined information for each slice by using a flag (for example, scalable_ref_layer_set_vps_flag).

At this time, the encoder can decide whether encoding has been performed by an existing method for representing layer dependency according to flag information defined in the VPS extension (for example, vps_srls_present_flag) or whether encoding has been performed by a method for representing layer dependency using an SRLS.

In case the encoding has been performed by a method for representing layer dependency using an SRLS, the encoder can encode new layer dependency in a current slice according to scalable_ref_layer_set_vps_flag or can encode syntax information (for example, scalable_ref_layer_set_Idx) informing of which layer dependency set to use from among layer dependency sets established in the VPS extension.

On the other hand, in case encoding has been performed in the VPS extension by an existing method for representing layer dependency, layer dependency to be used in a current slice according to scalable_ref_layer_set_vps_flag can be defined in the same way as defined by the method for using/changing layer dependency in the current slice, where the layer dependency in the VPS extension is analyzed by the existing method.

Table 4 is one example of syntax illustrating a method for using/changing layer dependency in a current slice, where the layer dependency in the VPS extension is represented in the form of an SRLS.

TABLE 4

| | Descriptor |
|---|---|
| slice_segment_header ( ) { | |
| .... | |
| if ( !IdrPicFlag ) { | |
| pic_order_cnt_lsb | u(v) |
| short_term_ref_pic_set_sps_flag | u(1) |
| if ( ! short_term_ref_pic_set_sps_flag ) | |

TABLE 4-continued

| | Descriptor |
|---|---|
| short_term_ref_pic_set( num_short_term_ref_pic_sets) | |
| else | |
| short_term_ref_pic_set_idx | u(v) |
| scalable_ref_layer_set_vps_flag | u(1) |
| if ( vps_srls_present_flag ) { | |
| if ( !scalable_ref_layer_set_vps_flag ) | |
| scalable_ref_layer_set (num_scalable_ref_layer_set ) | |
| else | |
| scalable_ref_layer_set_Idx | u(v) |
| } | |
| else { | |
| if ( !scalable_ref_layer_set_vps_flag ) { | |
| num_scalable_ref_layer | u(3) |
| for ( i = 0; i < num_scalable_ref_layer; i ++ ) | |
| Scalable_ref_layer [ i ] | u(6) |
| } | |
| } | |
| .... | |
| } | |
| .... | |
| } | |

The encoder or decoder constructs a reference picture list S520.

The inter-layer reference picture list can be managed by inter-layer dependency defined in a VPS extension or slice header. At this time, by using the method described through the steps of S500 to S510, layer dependency in the VPS extension and slice header can be analyzed.

The encoder or decoder can add a layer dependency set (ScalableRefLayerSet, hereinafter, SRLS) when constructing a reference picture list after analyzing layers to be referenced by each layer. Layers to be referenced, as many as the number of reference layers analyzed in the VPS extension or slice header, can be specified in the SRLS. Also, images having dependency analyzed in the VPS extension or slice header and having the same POC as a current picture in a reference layer can be specified in the SRLS. The pictures belonging to the SRLS are all marked as "used for long-term reference".

A method for constructing a reference picture list including an SRLS according to the present invention will be described in detail with reference to FIG. 7.

FIG. 6 illustrates a method for constructing a scalable reference layer set (SRLS) or a layer dependency set according to the present invention.

With reference to FIG. 6, M scalable reference layer sets can be defined, and each scalable reference layer set can comprise a plurality of layer IDs.

The scalable reference layer set 1 comprises A layer IDs, scalable reference layer set 2 comprises B layer IDs, and scalable reference layer set M comprises K layer IDs.

The layer IDs constituting a scalable reference layer set can be specified by a difference between current layer ID and reference layer ID.

The encoder can encode the aforementioned scalable_ref_layer_set( ) to construct a scalable reference layer set. scalable_ref_layer_set( ) can encode syntax information informing of the number of reference layers (for example, num_ref_layer), syntax information representing signs of the differences of layer_ids between the current layer and reference layers as many as the number of reference layers (for example, delta_layer_id_sign), and syntax information representing absolute value of the difference; and transmit the encoded syntax information. At this time, the syntax information encoded by scalable_ref_layer_set( ) (for example, num_ref_layer, delta_layer_id_sign, abs_delta_layer_id[i]) can be specified for each scalable reference layer set and so encoded.

Table 5 is a syntax table of scalable_ref_layer_set( ) to construct a scalable reference layer set.

TABLE 5

| | Descriptor |
|---|---|
| scalable_ref_layer_set ( idxRps ) { | |
|    if ( idxRps == num_scalable_ref_layer_set ) | |
|       delta_srls_idx_minus1 | ue(v) |
|    num_ref_layer | ue(v) |
|    for ( i = 0; i < num_ref_layer; i ++) { | |
|       delta_layer_id_sign | u(1) |
|       abs_delta_layer_id_minus1[ i ] | ue(v) |
|    } | |
| } | |

With reference to Table 5, num_scalable_ref_layer_set represents the number of scalable reference layer sets.

The value of delta_srls_idx_minus1 added by 1 specifies a scalable reference layer set and represents a difference from the previous scalable reference layer set.

num_ref_layer represents the number of reference layers.

delta_layer_id_sign represents a sign of the difference between a current layer and reference layer.

abs_delta_layer_id[i] represents an absolute value of the difference between the current layer and reference layer.

The decoder finds out the number of reference layers constructing a reference layer set through num_ref_layer and obtains differences of layer_ids between the current layer and reference layers through delta_layer_id_sign and abs_delta_layer_id[i] signaled as many times as the number of reference layers.

Figure 7:
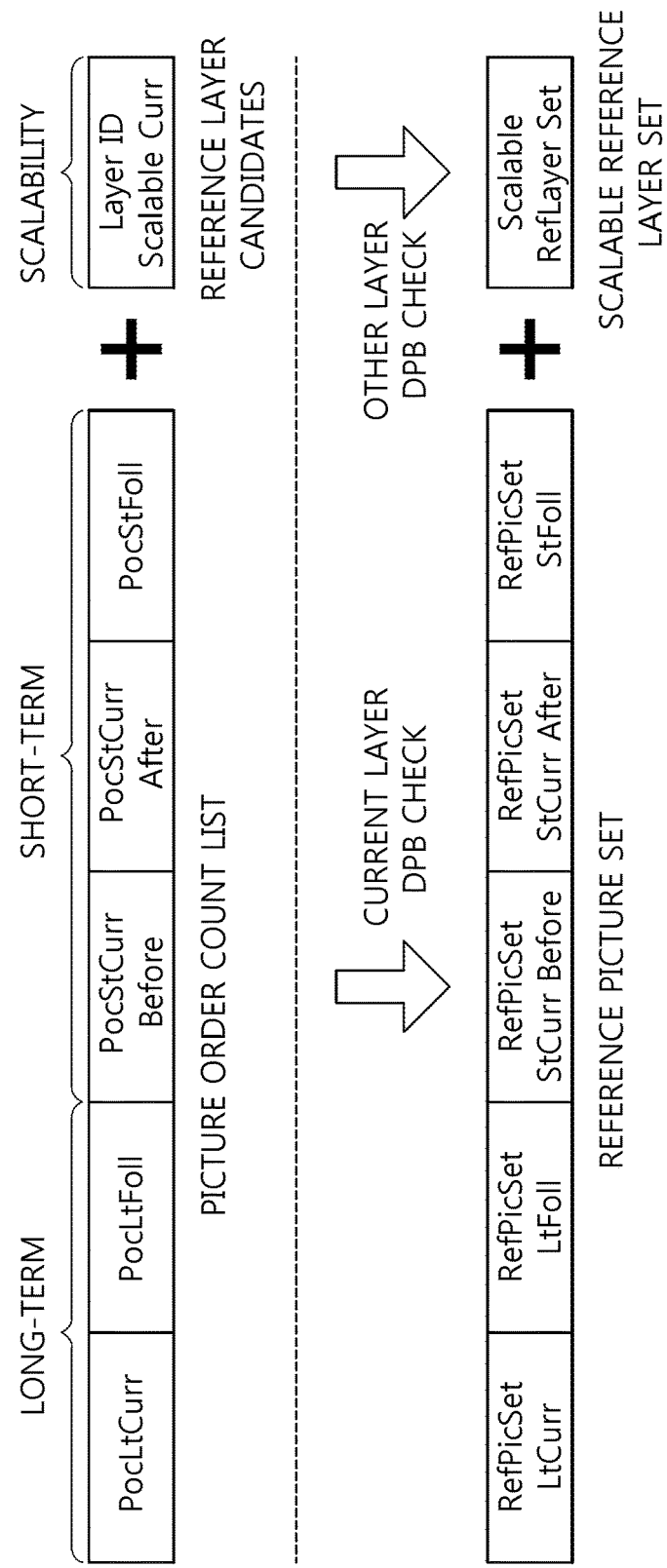
FIG. 7 illustrates a method for constructing a reference picture list (a list of reference images) according to the present invention.

FIG. 7 illustrates a method for constructing a reference picture list (a list of reference images) according to the present invention.

With reference to FIG. 7, to derive a reference image set included in a current layer before decoding a current image, five lists consisting of POC values and one list used for inter-layer prediction can be constructed.

The five lists (picture order count (POC) list) consisting of POC values can include PocLtCurr, PocLtFoll, PocStCurrBefore, PocStCurrAfter, and PocStFoll. The individual lists include as many constituting elements (namely, POC values) as specified by NumPocStCurrBefore, NumPocStCurrAfter, NumPocStFoll, NumPocLtCurr, and NumPocLtFoll.

PocLtCurr is a list used by a current picture and includes POC of a long-term reference picture, which is larger than the POC of the current picture; PocLtFoll is a list including the POC of a long-term reference picture not used by the current picture. PocLtCurr and PocLtFoll are used for constructing a long-term reference picture set.

PocStCurrBefore is a list used by a current picture and includes POC of a short-term reference picture, which is smaller than the POC of the current picture. PocStCurrAfter is a list used by the current picture and includes POC of a short-term reference picture, which is larger than the POC of the current picture. PocStFoll is a list including POC of a short-term reference picture not used by the current picture.

PocStCurrBefore, PocStCurrAfter, and PocStFoll are used to construct a short-term reference picture set.

One list used for inter-layer prediction can include reference layer candidates to support scalability. The reference layer candidates can be comprised of layer IDs (LayerIDScalableCurr) of reference layer candidates for inter-layer prediction. LayerIDScalableCurr is used for constructing a scalable reference layer set.

The encoder or decoder can derive five reference image sets from the five POC lists by checking the decoded picture buffer (DPB) which stores decoded pictures with respect to a current layer and construct a reference layer set (ScalableRefLayerSet) to be used for inter-layer prediction from the LayerIDScalableCurr by checking the DPBs of other layers.

The scalable reference layer set (ScalableRefLayerSet) can be constructed by using as many reference layers as the number of reference layers signaled by the VPS extension or slice header.

In the scalable reference layer set (ScalableRefLayerSet), an image having the same POC as the current picture can be designated by a reference layer having dependency signaled by the VPS extension or slice header.

The images constituting the scalable reference layer set (ScalableRefLayerSet) are all indicated as being used for long-term reference.

The encoder or decoder can derive a reference picture list on the basis of the reference image set and scalable reference layer set; and perform inter-prediction or inter-layer prediction by using the reference picture list.

According to the present invention, a reference image belonging to a different layer is constructed as a scalable reference layer set (SRLS) is added to an existing reference picture set (RPS); therefore, reference images can be managed in an integrated manner irrespective of the type of scalability. Also, DPB management carried out in a current layer does not affect the DPBs of other layers.

In the embodiments described above, although methods have been described through a series of steps or a block diagram, the present invention is not limited to the order of steps and some step can be carried out in a different order and as a different step from what has been described above, or some step can be carried out simultaneously with other steps. Also, it should be understood by those skilled in the art that those steps described in the flow diagram are not exclusive; other steps can be incorporated to those steps; or one or more steps of the flow diagram can be removed without affecting the technical scope of the present invention.

Embodiments above are provided to illustrate the technical principles of the present invention; thus, it should be understood that those skilled in the art to which the present invention belongs will be able to change or modify the embodiments in various other ways unless changes or modifications of the embodiments depart from the inherent characteristics of the present invention. Therefore, those embodiments disclosed in this document are not intended to limit the technical principles of the present invention but to describe the technical principles; and the technical scope of the present invention is not limited by those embodiments. The technical scope of the present invention should be interpreted by the appended claims and all the technical principles belonging to the scope equivalent to that defined by the claims should be understood to be included in the claimed scope of the present invention.

What is claimed is:

1. A method for image decoding that supports multiple layers performed by an image decoding apparatus, the method comprising:
    analyzing a first layer dependency on a current layer based on a video parameter set (VPS) extension;
    analyzing a second layer dependency on a current slice based on information encoded in a slice unit, wherein analyzing the second layer dependency on the current slice comprises
        determining whether the current slice uses the first layer dependency of the VPS extension or the second layer dependency of the slice unit,
        obtaining, in response to a determination that the current slice uses the second layer dependency of the slice unit, first information indicating the number of reference pictures for inter-layer prediction of the current slice and second information identifying reference layers to which the reference pictures belong, the first information and the second information being signaled in the slice unit, and
        analyzing the second layer dependency on the current slice based on the first information and the second information;
    constructing a reference picture list for the current slice based on at least one of the first layer dependency on the current layer and the second layer dependency on the current slice; and
    performing prediction to generate a prediction block of a current block to be decoded.

2. The method of claim 1, wherein the reference picture list includes a long-term reference picture set, a short-term reference picture set and the reference layer set,
    and the reference layer set includes a picture of a reference layer having the same Picture Order Count (POC) as a current picture of the current layer.

3. A method for image encoding that supports multiple layers performed by an image encoding apparatus, the method comprising:
    encoding a first layer dependency on a current layer using a video parameter set (VPS) extension by determining the first layer dependency on the current layer;
    encoding a second layer dependency on a current slice in a slice unit by determining the second layer dependency on the current slice, wherein encoding the second layer dependency on the current slice comprises
        determining whether the current slice uses the first layer dependency of the VPS extension or the second layer dependency of the slice unit,
        determining, in response to a determination that the current slice uses the second layer dependency of the slice unit, the number of reference pictures for inter-layer prediction of the current slice and reference layers referenced by the current slice, the number of reference pictures for inter-layer prediction and the reference layers being determined in the slice unit, and
        encoding the second layer dependency on the current slice based on the number of reference pictures for inter-layer prediction and the reference layers;
    constructing a reference picture list for the current slice based on at least one of the first layer dependency on the current layer and the second layer dependency on the current slice; and
    performing prediction to generate a prediction block of a current block to be encoded.

4. The method of claim 3, wherein the reference picture list includes a long-term reference picture set, a short-term reference picture set and the reference layer set,
    and the reference layer set includes a picture of a reference layer having the same Picture Order Count (POC) as a current picture of the current layer.

5. An apparatus for image decoding that supports multiple layers, the apparatus comprising:
    a decoder configured to
    analyze a first layer dependency on a current layer based on a video parameter set (VPS) extension,
    determine whether the current slice uses the first layer dependency of the VPS extension or a second layer dependency of a slice unit,
    obtain, in response to a determination that the current slice uses the second layer dependency of the slice unit, first information indicating the number of reference pictures for inter-layer prediction of the current slice and second information identifying reference layers referenced by the current slice, the first information and the second information being signaled in the slice unit, and
    analyze the second layer dependency on the current slice based on the first information and the second information; and
    a predictor configured to construct a reference picture list for the current slice based on at least one of the first layer dependency on the current layer and the second layer dependency on the current slice, and perform prediction to generate a prediction block of a current block to be decoded.

6. A non-transitory computer-readable medium storing a bitstream, wherein the bitstream is generated by a method for image encoding that supports multiple layers performed by an image encoding apparatus, the method comprising:
    encoding a first layer dependency on a current layer using a video parameter set (VPS) extension by determining the first layer dependency on the current layer;
    encoding a second layer dependency on a current slice in a slice unit by determining the second layer dependency on the current slice, wherein encoding the second layer dependency on the current slice comprises:
        determining whether the current slice uses the first layer dependency of the VPS extension or the second layer dependency of the slice unit;
        determining, in response to a determination that the current slice uses the second layer dependency of the slice unit, the number of reference pictures for inter-layer prediction of the current slice and reference layers referenced by the current slice, the number of reference pictures for inter-layer prediction and the reference layers being determined in the slice unit; and
        encoding the second layer dependency on the current slice based on the number of reference pictures for inter-layer prediction and the reference layers;
    constructing a reference picture list for the current slice based on at least one of the first layer dependency on the current layer and the second layer dependency on the current slice; and
    performing prediction to generate a prediction block of a current block to be encoded.

* * * * *